United States Patent [19]

Niihara et al.

[11] Patent Number: 5,263,015
[45] Date of Patent: Nov. 16, 1993

[54] MAGNETO-OPTICAL RECORDING MEDIA AND OVERWRITE RECORDING METHOD USING THE SAME

[75] Inventors: Toshio Niihara, Sayama; Harukazu Miyamoto, Hachioji; Makoto Miyamoto, Yokohama; Keikichi Andoo, Musashino; Tsuyoshi Toda, Kodaira; Atsushi Saito, Ichikawa; Masahiro Ojima, Tokyo, all of Japan; Yoshio Suzuki, Eindhoven, Netherlands; Hiroyuki Awano, Nagareyama, Japan

[73] Assignees: Hitachi, Ltd., Tokyo; Hitachi Maxwell, Ltd., Osaka, both of Japan

[21] Appl. No.: 795,506

[22] Filed: Nov. 21, 1991

[30] Foreign Application Priority Data

Nov. 21, 1990 [JP] Japan .................. 2-313946
Mar. 18, 1991 [JP] Japan .................. 3-052130

[51] Int. Cl.$^5$ .............................................. G11B 7/00
[52] U.S. Cl. ...................................... 369/116; 369/100; 369/275.2
[58] Field of Search ............ 369/100, 116, 112, 275.1, 369/288, 13

[56] References Cited

U.S. PATENT DOCUMENTS

| 4,939,717 | 7/1990 | Ohno et al. | 369/116 |
| 5,025,439 | 6/1991 | Komaki et al. | 369/100 |
| 5,123,007 | 6/1992 | Miyauchi et al. | 369/100 |

FOREIGN PATENT DOCUMENTS 62-175948 8/1987 Japan .

OTHER PUBLICATIONS

Iida et al. "Recording Power Characteristics of 130 mm Overwritable MO Disk by Laser Power Modulation Method" *Japanese Journal of Applied Physics*, vol. 28 (1989), pp. 367-370.

Mutoh et al. "Study for the Intermediate Layer in Magnetic Triple Layer File for Overwriting by Light Intensity Modulation" 10pF- 6, 14th scientific lecture of the Japan Society of Applied Magnetism (1990) (1990) p. 376.

*Primary Examiner*—Paul M. Dzierzynski
*Assistant Examiner*—Jim Beyer
*Attorney, Agent, or Firm*—Antonelli, Terry, Stout & Kraus

[57] ABSTRACT

According to this invention, since the range of power necessary for erasing an overwritable magneto-optical recording medium is set to 2.5 mW or above, overwriting is possible without erase residue due to mark (magnetic domain) diameter difference, tracking offset, ambient temperature variation and characteristic dispersion between magneto-optical recording media and thus the magneto-optical recording medium has high reliability. Moreover, the rate of change, K of the switching field of the memory layer relative to temperature at around an erase start temperature can be controlled to be a constant value so that an erase power margin can be increased and that the tolerance to the reading light when the ambient temperature rises can be improved.

12 Claims, 10 Drawing Sheets

F I G. 11
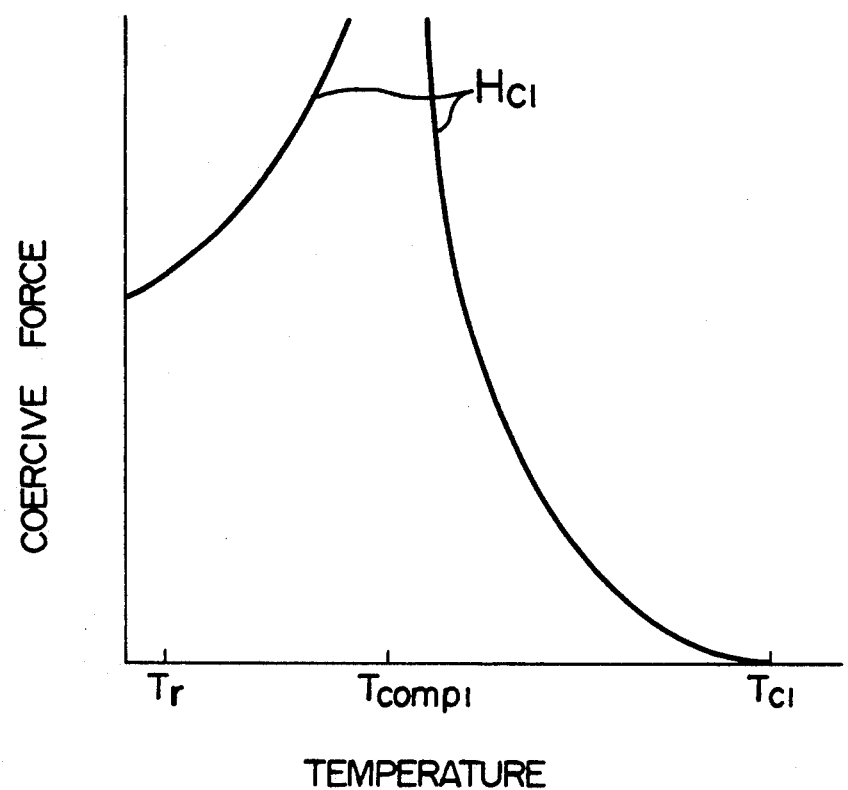
F I G. 12
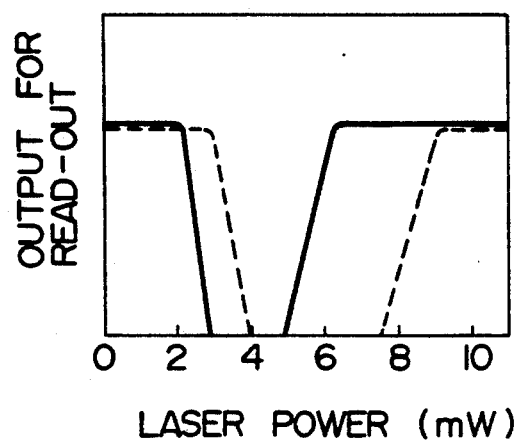

F I G. 17
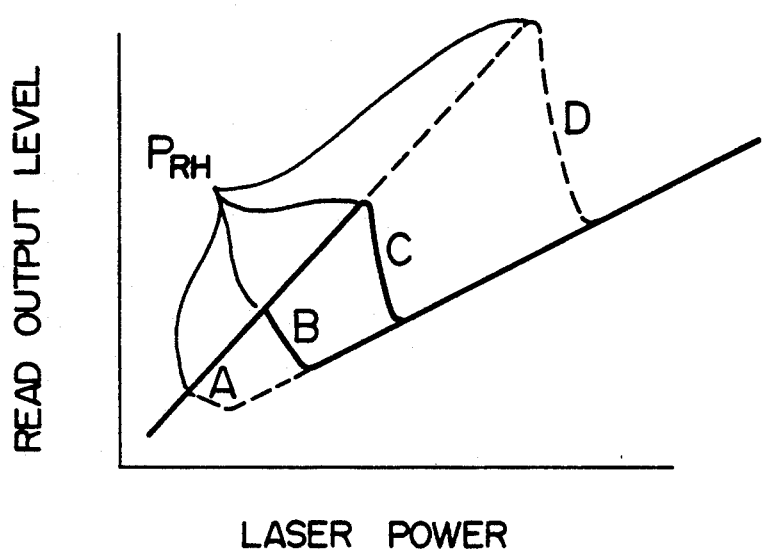
F I G. 18
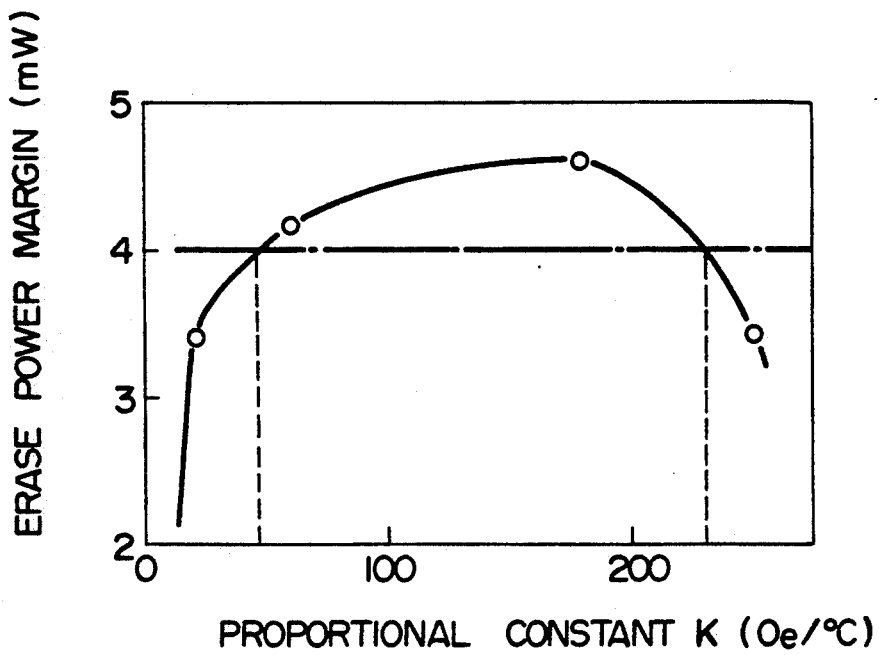

MAGNETO-OPTICAL RECORDING MEDIA AND OVERWRITE RECORDING METHOD USING THE SAME

BACKGROUND OF THE INVENTION

The present invention relates to an overwritable magneto-optical recording medium and recording method for use in recorders.

The magneto-optical recording, as well known, is the optical recording capable of writing, reading and erasing information and becomes the object of public attention in that it is capable of high-density recording which is very superior to the conventional magnetic recording. In addition, recently, a new magneto-optical recording method called overwrite has been proposed in which new information is written on a magneto-optical disk having information previously written, while the previously written information is being erased. This overwritable magneto-optical recording system can be roughly divided into a magnetic field modulation method and a light intensity modulation method.

As compared with the magnetic field modulation method, the light intensity modulation method is advantageous because the latter method can make high-speed modulation and high-speed recording and use a both-side recordable disk having two magneto-optical recording media respectively bonded to the opposite sides. The magneto-optical recording medium for realizing this light intensity modulation method is already known from the principle point of view as disclosed in, for example, Japanese Patent Laid-open Gazette No. 62-175948. That is, the magnetic layer used in the recording medium of this kind is an exchange-coupled double layer film having magnetic coupling.

The overwrite will be briefly described with reference to drawings. FIGS. 2 to 5 are diagrams useful for explaining the light intensity modulation method using the known exchange-coupled double layer film as the magnetic layer. The magnetic film for use in recording is a double layer film that is formed of a recording layer 15 and a memory layer 4.

FIG. 2 shows the relation between the temperature and the magnetic field and coercive force. At room temperature $T_r$, a coercive force 8 of the memory layer 4 is larger than a coercive force 9 of the recording layer 15, and a Curie temperature $T_9$ of the recording layer 15 is higher than a Curie temperature $T_8$ of the memory layer 4.

Upon recording, as shown in FIG. 3, the recording layer 15 is magnetized in the same direction as an initializing field 13 by an initializing magnet 17 as indicated at 18. The initializing magnet 17 is normally fixed to the disc drive so as to oppose the disk. The initializing magnet 17 is formed of a magnet or an electric magnet, and it has a constant intensity and produces a magnetic field in a constant direction. The magnitude of this initializing magnetic field 13 is larger than the coercive force 9 of the recording layer 15 and lower than the coercive force 8 of the memory layer 4 at room temperature $T_r$, as shown in FIG. 2. Thus, even when the initializing magnetic field 13 is applied to the memory layer 4, the direction of the magnetization 19 of the memory layer 4 is not changed.

Upon recording of information, the intensity of laser light is modulated by digital information of "1"s and "0"s being recorded under a constant-intensity bias field 14 shown in FIG. 2 so as to vary between a high laser power level (hereinafter, referred to as $P_H$) 23 and a low laser power level (hereinafter, referred to as $P_L$) 24 as shown in FIG. 6. The constant-intensity bias field 14 which is applied upon recording is different in both field strength and direction from the initializing field 13. This constant-intensity bias field 14 is produced in the constant direction from a magnet 22 which is fixed to the disk drive to oppose the disk as is the initializing magnet 17.

As illustrated in FIG. 4A or FIG. 5A, laser light 20 is focused into a predetermined spot diameter by a focus lens 21, and irradiated on the magnetic film. When the laser light intensity is $P_H$, the region irradiated with the laser light 20 is heated near to the Curie temperature $T_9$ of the recording layer 15 as shown in FIG. 2, and hence the temperature of the memory layer 4 already exceeds the Curie point $T_8$. Thus, the magnetization 19 of the memory layer 4 is extinguished as shown in FIG. 4A. On the other hand, the magnetization 18 of the recording layer 15 in the region at this temperature is in the same direction as that of the bias field 14 (in the opposite direction to the initializing field 13) since the bias field 14 from the magnet 22 is already larger than the coercive force 9 of the recording layer 15 as will be obvious from FIG. 2. When the laser light 20 is stopped from the irradiation, allowing the magnetic film to cool, the magnetization 19 of the memory layer 4 occurs in the same direction as the bias field 14, thus recording information.

When the laser light intensity is $P_L$, the temperature of the region irradiated with the laser light 20 is near the Curie temperature $T_8$ of the memory layer 4 as shown in FIG. 5A. Therefore, the coercive force 9 of the recording layer 15 is larger than the bias field 14 as shown in FIG. 2, and thus the magnetization 18 is not reversed. When the laser light is stopped from the irradiation, allowing the magnetic film to cool, the magnetization 19 of the memory layer 4 is also in the opposite direction to the bias field 14 as shown in FIG. 5B because it has a large exchange coupling force with the magnetization 18 of the recording layer 15 than the bias field 14.

As described above, the light intensity modulation method using the exchange coupling dubble film makes overwriting by modulating the laser light intensity to vary between the high level (recording) and the low level (erasing). In addition, upon reading-out of information, light (read-out) of which the level is smaller than the low level light is irradiated to the film. Thus, the laser light intensity is changed in three steps of different levels for recording, erasing and reading-out. Moreover, in order to cope with various disturbances such as the reduction of laser efficiency associated with the change of ambient temperature and laser output and the contamination of optical parts and to record, erase and read-out data without destroying data, it is necessary to take enough margin for these power levels.

The above conventional novel technique, however, has no consideration for assuring enough margin for the three power levels. Thus, this conventional technique cannot cope with various disturbance and has the problem that upon recording, erasing and reading-out the reliability of information is reduced.

In Proc. Int. Symp. on Optical Memory, 1989, a diagram (FIG. 3) of laser power margin is shown for the irradiation of light of f=4.93 MHz (modulated light).

In this paper, however, there is no description and suggestion about this invention. According to this invention, when laser light of a constant intensity with no modulation is irradiated on the continuously recorded stripe-shaped magnetic domain for which a widest power margin is required, making overwriting, the required power margin is found, and the film structure is set to have more than this margin or the light irradiation conditions are controlled for more than this margin, thereby making it possible to overwrite not only on the spot domain but also on any domain.

Moreover, as described in the summaries, 10PF-6 of the fourteenth scientific lecture of the Magnetic Society of Japan, the gradient of the plot of the transfer capability (corresponding to a proportional constant K in the equation, $Ht_1 = -K \cdot T + A$ (A is a constant) in this invention: this equation is the relation of the switching field $Ht_1$ of the memory layer relative to temperature T at an erase-starting temperature at which the recorded information starts to be erased when the medium temperature is increased) at a high temperature is only 50, maximum which is out of the range of $50 < K < 220$ according to this invention. Also, in this paper, there is no description and suggestion of the idea of the invention in which the film structure is set or the light irradiation conditions are controlled, so that $50 < K < 220$ can be satisfied.

SUMMARY OF THE INVENTION

Accordingly, it is a first object of the invention to provide an improved magneto-optical disk capable of practical overwriting by solving the problems in the prior art.

It is a second object of the invention to provide an improved overwrite recording method.

In order to achieve the above objects, it is necessary to analyze the adverse factors to the overwriting in the overwritable magneto-optical recording medium.

The low power level $P_L$ of the modulated power intensity of laser light plays the most important role in the overwrite operation. This is because the old information is being erased by the irradiation of $P_L$ while new information is being recorded by the irradiation of high power level $P_H$. If $P_L$ is too small, the old information is not erased. On the contrary, if $P_L$ is too large, recording starts. Therefore, $P_L$ must be selected to be within a certain optimum range of values.

This range is greatly changed by the film characteristics of the magneto-optical recording medium, the revolution rate of the medium and wavelength of recording laser light, and the numerical aperture of the object lens for focusing the laser light on the surface of the medium. Thus, the optimum range of $P_L$ cannot be found before these values are decided. Thus, after various examinations, the inventors of this application found that the objects could be achieved by the construction described below.

A magneto-optical recording medium according to this invention includes an optical substrate, a magnetic layer having perpendicular anisotropy provided on this substrate, and a protective layer formed on the magnetic layer. This magnetic layer is formed of an exchange-coupled double layer: a memory layer having a low Curie temperature and a high coercive force and a writing layer (recording layer) having a higher Curie temperature and a lower coercive force than this memory layer. The overwrite operation can be performed by modulating the laser light in two levels of high and low levels and irradiating it on the medium. The nonmodulated laser light of a constant intensity not modulated by predetermined recorded information is irradiated on this magneto-optical recording medium at the lowest-linear velocity position (the innermost track) of the effective region of the medium, thus recording a stripe magnetic domain. The nonmodulated laser light of a constant intensity is again irradiated on the recorded domain. While the strength is gradually increased. At this time, the difference between power $P_{EC}$ by which the above domain can be completely erased, and power $P_{WS}$ by which the domain starts to be again recorded is at least 2.5 mW or above. The magnetic layer and the protective layer, and a thermal diffusive layer, if necessary, are formed so as to achieve the above conditions.

FIG. 7 shows this principle. The abscissa is the laser power, and the ordinate is the read-out output. A curve 6 indicates the erase characteristic, and a curve 7 shows the writing characteristic. The range in which $P_L$ can be set is between $P_{EC}$ and $P_{WS}$. That is, $P_L$ is set within the width of this laser power of at least 2.5 mW or above. The overwritable magneto-optical recording medium of this invention is constructed on the basis of the above consideration.

The above protective layer, and the thermal diffusive layer formed if necessary, are normally formed of a nonmagnetic film such as a dielectric layer or metal. The width of the stripe magnetic domain to be recorded is 0.6 to 0.9 μm under the level of the present technique. If the technique is further developed for higher density recording, the width will be 0.5 μm or below. Moreover, the reason for the above phrase, "at the lowest-linear velocity position (the innermost track)", is that since the peripheral speed in the innermost track of the disk is the lowest, the disk is driven under the most severe condition and thus this condition is suitable for the evaluation of the reliability of the disk.

The overwritable magneto-optical recording medium is desired to have a higher performance than the conventional only-erasable magneto-optical recording medium. Therefore, the wavelength of the laser light for use in recording is desired to be 833 nm or below for high density recording. This wavelength is more preferably 783 nm or below.

The numerical aperture of the object lens is also desired to be 0.55 or above, preferably 0.6 for high density recording. Moreover, the size of the magneto-optical recording medium is desired to be 5.25 inches or below in diameter for the magneto-optical recording medium to be easy to handle and for the drive to be small-sized. This diameter may be, for example, 3.5 inches or 2 inches. At this time, in order to increase the data transfer rate, the revolution rate of the magneto-optical recording medium is preferably 2400 turns per minute. If it is 3600 turns/min, it is possible to achieve a data transfer rate equal to that in the magnetic recording media.

When the laser wavelength and the lens numerical aperture are 830 nm and 0.55, respectively, the width of the magnetic domain to be recorded is preferably 0.9 μm or below. As the laser light wavelength becomes short, and as the lens numerical aperture is increased, the width of the magnetic domain to be recorded is necessary to decrease. Since the present shortest semiconductor laser wavelength is 630 nm, the written domain width may be 0.6 μm. The track pitch on the disk substrate is preferably 1.6 μm or below. For this track pitch, the written domain width is necessary to be 0.9 μm or below. For 1.4-μm track pitch, the domain width is necessary to be 0.8 μm or below. In either case, to obtain enough read-out signal output, the domain width must be 0.6 μm or above under the present detector performance.

In order to achieve the overwrite recording method in the magneto-optical recording medium of the invention, at least one of the formed film characteristics of the magneto-optical recording medium, the revolution rate of the medium, the wavelength of the writing laser light, and the numerical aperture of the object lens for focusing the laser light on the surface of the medium must be controlled to be a predetermined value, thus establishing an optimum range of $P_L$.

When the constant-intensity, nonmodulated (so-called direct current like) laser light is irradiated on the magneto-optical recording medium at the innermost track of the actually used region of the medium, the range of erase power $P_L$ is between $P_{EC}$ and $P_{WS}$ as described with reference to FIG. 7, where $P_{EC}$ is the power by which the information can be completely erased, and $P_{WS}$ is the power by which information starts to be written. The difference between $P_{WS}$ and $P_{EC}$ is necessary to be at least 2.5 mW or above because of the following factors ①  to ④.

Factor ①

It should be noted that in the actual writing, the length of the mark (magnetic domain) to be written is dependent on the contents of information.

In this connection, in (2, 7) RLL modulation recording, the mark length has six possible values of 1.5 T, 2 T, 2.5 T, 3 T, 3.5 T and 4 T, where T is the bit length. When a mark of the same length as the written mark is tried to be written, there is no problem. However, if a short mark is tried to be written on a long mark (magnetic domain), $P_L$ higher than the minimum $P_L$ necessary for erasing the short mark is required since the mark width is proportional to the mark length. This situation prominently occurs when the shortest mark [1.5 T in (2, 7) modulation] is written on the longest mark [4 T in (2, 7) modulation]. The $P_L$ under the assumption of the worst case must be estimated to have a margin of about 0.3 mW.

Factor ②

Even when the light spot does not pass the center of a track but traces the track, slightly deviating from the center, the old information must be surely erased. If the same power as normal power $P_L$ is irradiated on the track at an area deviated from the center, the old information is not completely erased. Because this erase residue increases as the amount of the track offset increases, the power $P_L$ must be increased in proportion to the amount of the offset. The track offset is dependent on the tracking system and so on. In order to prevent the track offset, it has been tried that wobble pits are provided on the medium and that the tracking system is improved. From the above situations, the track offset should be estimated to be 0.1 μm in the practical operation. In this case, when the light spot is deviated 0.1 μm left relative to the advancing direction of the spot upon writing, and 0.1 μm right upon overwrite, the erase residue is easiest to occur. This means that marks 0.2 μm wider than normal are always erased. In other words, if $P_L$ is set so that marks 0.2 μm wider than normal can always be erased, it is possible to cope with the track offset of 0.1 μm. The amount of increase of $P_L$ necessary for this track offset is about 1.2 mW.

Factor ③

On the other hand, it is necessary to consider that the ambient temperature upon writing and upon overwrite is always changing. The ambient temperature at which the magneto-optical recording medium is operated is specified to be 0° C. to 50° C. by ISO (international standard). Therefore, the worst situation in the erasing operation is that the mark recorded at 50° C. is erased at 0° C. The reason for this is that the mark width is the widest at ambient temperature of 50° C. and the narrowest at ambient temperature of 0° C. Thus, in order to assure complete erase even in the above worst case, a margin of 0.5 mW is required in addition to the power $P_L$ necessary upon overwrite at the same temperature.

Factor ④

The power $P_L$ must be selected to be higher because the characteristics of the media are not uniform, or have a dispersion. Some medium can be erased by $P_L$ of 4 mW, but another one may need $P_L$ of 5 mW for the erasing. This is because when a large number of the medium are produced, the media have different Curie temperatures and thicknesses and because the rots of the media are processed at different degrees of vacuum which the sputtering apparatus is controlled to reach. However, a certain degree of dispersion must be accepted. This degree of dispersion, when converted into corresponding power of $P_L$, can be estimated to be about 0.5 mW.

Thus, the value of $P_L$ to be selected must be increased by 2.5 mW, considering all the factors ①, ②, ③ and ④. In other words, the difference between $P_{WS}$ and $P_{EC}$ is required to be 2.5 mW or above. In addition, considering the worst case in each of the factors ① to ④, or that the nonmodulated laser light of a constant intensity is irradiated, the difference between $P_{WS}$ and $P_{EC}$ is also required to be 2.5 mW or above. Since the power $P_{WS}$ and $P_{EC}$ are closer as the linear velocity decreases, the difference between $P_{WS}$ and $P_{EC}$ is required to be 2.5 mW or above at the innermost track of the actually used region of the magneto-optical recording medium.

Moreover, the first object of this invention can be achieved by the following medium.

(1) A magneto-optical recording medium of the type in which at least two exchange-coupled magnetic layers of a memory layer and writing layer on a substrate, laser light is irradiated on the double layer magnetic film from the memory layer side, the power of the laser is modulated to have two levels of high power (writing power) and low power (erasing power), making it possible to overwrite, and laser light of lower power (reading out) than the low power level is irradiated on the medium, reading out the information from the medium, wherein when a switching field $Ht_1$ of the memory layer relative to temperature T is expressed as $$Ht_1 = -K \cdot T + A \text{ (A is a constant)},$$

the proportional constant K is selected to be $$50 \ (Oe/^{\circ}C.) < K < 220 \ (Oe/^{\circ}C.)$$

at an erase start temperature $T_{ES}$ at which the already recorded information starts to be erased when the temperature of said medium is increased (1 Oe=79.6 A/M).

(2) A magneto-optical recording medium according to the medium (1), wherein when the recording field $H_{rec}$ dependence of laser power $P_{ES}$ by which the recorded information starts to be erased when the irradiated laser power is increased is expressed as $$P_{ES} = K' \cdot H_{rec} + B \text{ (B is a constant)},$$

the proportional constant $K'$ satisfies the following condition:

$$0.2 \text{ (mW/kOe)} < K' < 1.4 \text{ (mW/kOe)}; (1 \text{ Oe} = 79.6 \text{ A/M}).$$

(3) A magneto-optical recording medium according to the medium (1) or (2), wherein the relation between the Curie temperature $Tc_1$ of the memory layer and the compensation temperature $Tcomp_1$ of the memory layer is expressed as $$70° C. < Tc_1 - Tcomp_1 < 160° C.$$

(4) A magneto-optical recording medium according to the medium (1), (2) or (3), wherein the relation between the erase-start temperature $T_{ES}$ and the compensation temperature $Tcomp_1$ of the memory layer is expressed by $$20° C. < T_{ES} - Tcomp_1 < 70° C.$$

The erase process caused by the low level laser light irradiation is the process of the magnetization of the memory layer according to the magnetization of the writing layer. For good understanding of this invention, this erase process will be described with reference to FIGS. 8 and 9, and the principle of this invention will be mentioned in detail with reference to FIGS. 10 and 11.

As shown in FIG. 8, when the writing layer 15 is initialized before the erase process, an exchange coupling magnetic field $Hex_1$ acts on the memory layer 4 so that the magnetization 19 of the memory layer 4 is in the same direction of the magnetization 18 of the writing layer 15. The coercive force $Hc_1$ of the memory layer 4 acts to hold the direction of the magnetization 19 of the memory layer 4 irrespective of the direction of the magnetization 19 of the memory layer 4. Since the erase process is the process for making the magnetization 19 of the memory layer 4 and the magnetization 18 of the recording layer 15 in the same direction from the opposite magnetization directions, the effective switching field $Ht_1$ of the memory layer 4 can be expressed by the difference between the exchange coupling field $Hex_1$ and the coercive force $Hc_1$, or $$Ht_1 = Hc_1 - Hex_1.$$

Since the coercive force $Hc_1$ is large at room temperature $Tr$, the switching field $Ht_1$ has a positive value as shown in FIG. 9. Thus, the magnetization 19 of the memory layer 4 is not inverted. However, when the temeprature of the memory layer 4 is increased by the laser light, the exchange coupling field $Hex_1$ is not so changed, but the coercive force $Hc_1$ is suddenly decreased. Thus, the switching field $Ht_1$ decreases, and finally becomes a negative value. On the other hand, the writing field $Hrec$ acts to change the direction of the magnetization 19 of the memory layer 4 to the opposite direction to the magnetization 18 of the writing layer 15. Therefore, the erase process starts at the temperature at which the absolute value of the negative switching field $Ht_1$ has become larger than the absolute value of the writing field $Hrec$. The temperature $T_{ES}$ at which the erase process starts satisfies the following relation:

$$Hc_1 - Hex_1 = Ht_1 = -Hrec$$

Since the coercive force of the magnetic film generally has a width as shown in FIG. 10, the width $\Delta Hc$ of the coercive force of the memory layer is expressed as $$\Delta Hc = Hc_{1MAX} - Hc_{1MIN}$$

where $Hc_{1MAX}$ is the maximum value of the $Hc_1$ at a certain temperature, and $Hc_{1MIN}$ is the minimum value.

Then, there should be a temperature width between the start and end of the erase process. Thus, if the temperature at the start of the erase process and the temperature at the end of the erase process when the temperature T of the first magnetic layer is raised are respectively represented by $T_{ES}$ and $T_{EC}$, the temperature width $T_{EC} - T_{ES}$ required for this transition range can be expressed as $$T_{EC} - T_{ES} = \Delta Hc / K$$

where K is a proportional constant relative to the temperature T of the switching field $Ht_1$ when the switching field is expressed by $$Ht_1 = -K \cdot T + A \text{ (A is a constant)}$$

In addition, if the temperature rise of the magnetic layer per 1 mW is represented by the light intensity temperature transformation coefficient, $K_{T/P}$, the laser power at the start of the erase process by the erase start laser power $P_{ES}$, and the laser power at the end of the erase process by the erase end laser power $P_{EC}$, then the following equation is satisfied:

$$T_{EC} - T_{ES} = K_{T/P} (P_{EC} - P_{ES})$$

Therefore, the laser power necessary for the erase process can be expressed by $$P_{EC} - P_{ES} = \Delta Hc / (K \cdot K_{T/P})$$

In order to reduce $P_{EC} - P_{ES}$ or $T_{EC} - T_{ES}$, we can consider from the above discussions
 (1) to decrease the width $\Delta Hc$ of the coercive force (to improve the rectangualrity of the magnetic film),
 (2) to increase the light intensity temperature transformation coefficient $K_{T/P}$ (to increase the sensitivity of the disk) and
 (3) to increase the proportional constant K (to make steep the temperature change of $Hc_1$ at around $T_E$).

The consideration (1) is associated with the composition of magnetic film and the film preparation, and for realizing the overwrite characteristics it is, at present, inevitable to fix the width of the coercive force. In other words, to achieve (1) it is necessary to fundamentally change the material and film preparation apparatus. The consideration (2) results in the increase of the temperature rise of the magnetic film per 1 mW. Thus, in order to write at the same power as in the prior art, it is necessary to greatly increase the Curie temperature $Tc_2$ of the writing layer. Then, upon writing, the magnetic film is heated to a high temperature, and as a result the magnetic film is deteriorated so that the number of the overwrite cycles is reduced. The proportional constant in consideration (3) can be greatly changed by the change of the relation between the compensation temperature $Tcomp_1$ and the Curie temperature $Tc_1$, thus bringing about a great effect.

The operation upon signal reproduction will be described with reference to FIG. 9. The upper limit of the temperature at which the already written information is not destroyed by the rise of the ambient temperature and the increase of the read power intensity is represented by $T_{ER}$. Also, it is assumed that upon reproduction no field is applied, or Hrec=0. When the medium temperature rises so that the switching field $Ht_1$ becomes a negative value, the erase process occurs, destroying the already written information. Therefore, the temperature at which $$Ht_1 = 0,$$

is satisfied is $T_{ER}$. Then, $T_{ER}$ is lower than $T_{ES}$ as shown in FIG. 9, and thus the transition range between reproduction and erase is increased by the amount corresponding to $T_{ES} - T_{ER}$. Therefore, the laser power necessary for the reproduction-erase transition range can be reduced by decreasing the difference $T_{ES} - T_{ER}$. Here, $T_{ES} - T_{ER}$ can be expressed as $$T_{ES} - T_{ER} = Hrec/K$$

Moreover, this relation is replaced by the relation between the upper limit $P_{RH}$ of the reproduction power at which the already written information is not destroyed and the erase start temperature $P_{ES}$, or $$P_{ES} - P_{RH} = Hrec/(K \cdot K_{T/F})$$

In order to reduce $T_{ES} - T_{ER}$ or $P_{ES} - P_{RH}$, we can consider from the above examination (1) to decrease the recording field Hrec,
(2) to increase the light intensity temperature transformation coefficient $K_{T/F}$ and
(3) to increase the proportional constant K.

As for (1), a great effect cannot be expected. In other words, normally Hrec is as small as 24-40 kA/m (300-500 Oe). Further decrease of Hrec will cause an adverse effect on the recording characteristics. The consideration (2) is not practical, but (3) is effective, as described above.

Accordingly, it was found that the increase of K is very effective.

The memory layer is preferably made of an amorphous film of rear earth and transition metal, for example, Tb-Fe-Co, Gd-Dy-Fe-Co or Gd-Tb-Fe.

As shown in FIG. 10, these films have the temperature at which the coercive force $Hc_1$ diverges, or the compensation temperature $Tcomp_1$, depending on the adjustment of composition elements. The gradient of the coercive force $Hc_1$ is positive at a temperature lower than $Tcomp_1$, but negative at a higher temperature than that. In addition, since the coercive force $Hc_1$ of the memory layer is diverged at the compensation temperature $Tcomp_1$, the absolute value of the gradient suddenly increases at around the compensation temperature $Tcomp_1$. The exchange coupling field $Hex_1$ acting on the memory layer is almost not dependent on the temperature. Therefore, in order to increase the proportional constant, it is preferable to set the erase-start temperature $T_{ES}$ at the higher temperature side of the compensation temperature $Tcomp_1$. That is, at the erase start temperature $T_{ES}$ at which $$Ht_1 = -Hrec$$

is satisfied, when the change of the switching field $Ht_1$ of the memory layer relative to the temperature T is expressed as $$Ht_1 = -K \cdot T + A \text{ (A is a constant)},$$

the proportional constant K should be confined within the range of $$50 \ (Oe/°C) < K < 220 \ (Oe/°C); \ (1 \ Oe = 79.6 \ A/M)$$

In addition, when the recording field Hrec dependence of the power $P_{ES}$ by which the already written information starts to be erased when the irradiated laser power is gradually increased is expressed as $$P_{ES} = -K' \cdot Hrec + B \text{ (B is a constant)},$$

the proportional constant K' in the above expression is selected to satisfy the following condition, $$0.2 \ (mW/k \ Oe) < K' < 1.4 \ (mW/k \ Oe),$$

under which the same effect can be achieved (1 Oe=79.6 A/M).

Moreover, if the Curie temperature $Tc_1$ and the compensation temperature $Tcomp_1$ have the following relation, $$70° \ C. < Tc_1 - Tcomp_1 < 160° \ C.,$$

the proportional constant K and K' can be controlled to have the above values.

Furthermore, if the relation between the erase start temperature $T_{ES}$ and the compensation temperature $Tcomp_1$ of the memory layer satisfies the following condition, $$20° \ C. < T_{ES} - Tcomp_1 < 70° \ C.,$$

better results can be obtained.

BRIEF DESCRIPTION OF THE DRAWINGS

FIGS. 8, 9, 10 and 11 are graphs for explaining the principle of the magneto-optical recording medium of the invention.

FIG. 12 is a diagram showing the erase, writing characteristics of the magneto-optical recording medium of embodiment 1.

FIGS. 15, 16, 17, 18, 19 and 20 are graphs showing the characteristics of the magneto-optical recording media of the invention.

DESCRIPTION OF THE PREFERRED EMBODIMENTS

This invention will be described with reference to the accompanying drawings.

Embodiment 1

Figure 1:
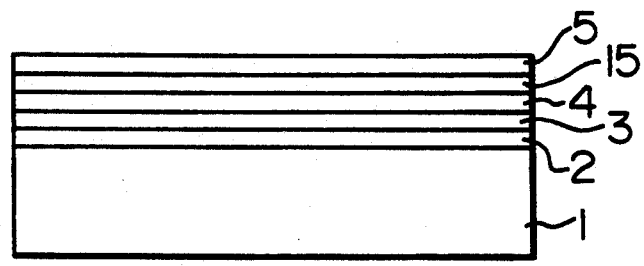
FIG. 1 is a cross-sectional diagram of one embodiment of a magneto-optical recording medium of the invention.
Figure 2:
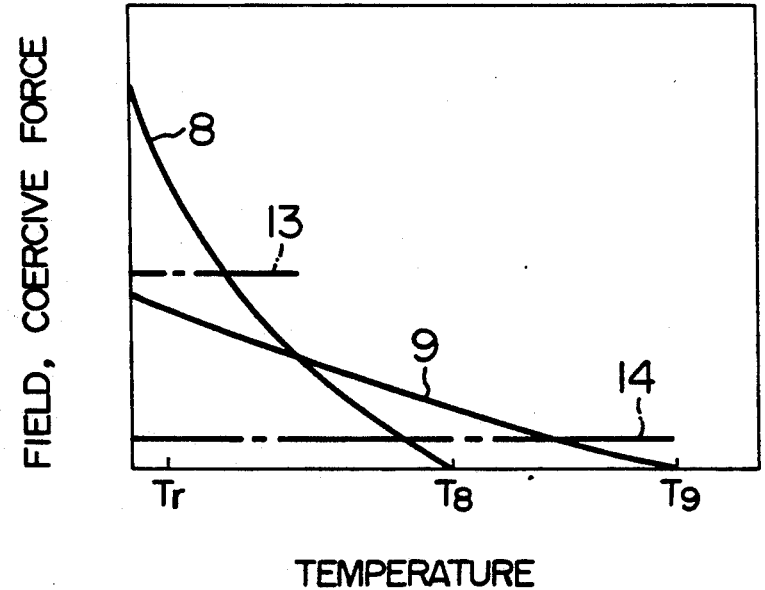
FIG. 2 is a graph for explaining the principle of overwrite and the relation between the temperature and the magnetic field, coercive force.

FIG. 1 is a longitudinal cross-sectional diagram of a magneto-optical recording medium. An ultra-violet light curing resin layer 2 of a thickness of 30 μm having grooves formed at a pitch of 1.6 μm was provided on a disk-like glass substrate 1. Then, the following films were sequentially deposited thereon by sputtering. First, a silicon nitride film 3 was deposited to a thickness of 850 Å so as to serve as a multireflection interference film. Upon sputtering, the target was silicon, the sputtering gas was mixture gas of argon and nitrogen, and the pressure was 10 mTorr. The reflectivity of the silicon nitride can be controlled by changing the mixture ratio of nitrogen gas. In this embodiment, the mixture ratio of nitrogen gas was selected to be 8% for a reflectivity of 2.1.

Then, a film of $Tb_{20}Fe_{72}Co_8$ having a Curie temperature $T_8$ of 170° C. was deposited to a thickness of 400 Å for the memory layer 4 (first magnetic layer), and a film of $Tb_{17}Dy_{16}Fe_{50}Co_{17}$ having a Curie temperature $T_9$ of 250° C. was deposited to a thickness of 1500 Å for the writing layer 15 (second magnetic layer).

The target was a composite target of an Fe plate having tips of Tb, Dy and Co disposed thereon. Of course, it may be an alloy target having constituents elements adjusted at a certain ratio. Finally, the silicon nitride film 5 was formed as a protective film for protecting the magnetic layers from being oxidized and corroded. At this time, the thickness of the silicon nitride film 5 was changed to be 200 Å for a magneto-optical recording medium A and 2000 Å for a magneto-optical recording medium B.

Figure 3:
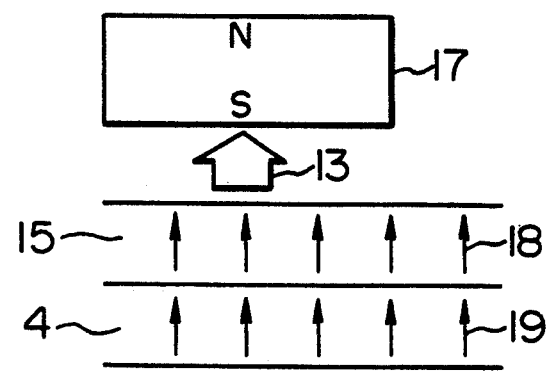
FIG. 3 is a diagram for explaining the principle of overwrite and initialization.
Figure 4A:
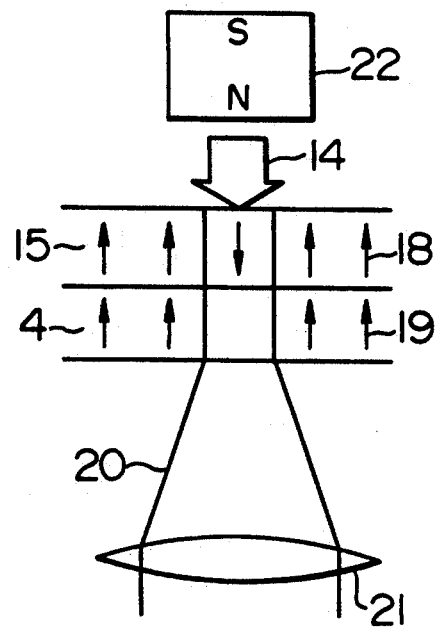
FIGS. 4A and 4B are diagrams for explaining the principle of overwrite and high laser power level $P_H$ upon recording.
Figure 4B:
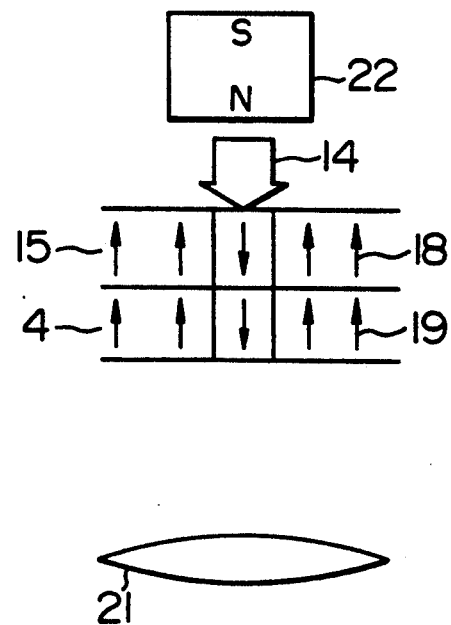
Figure 5A:
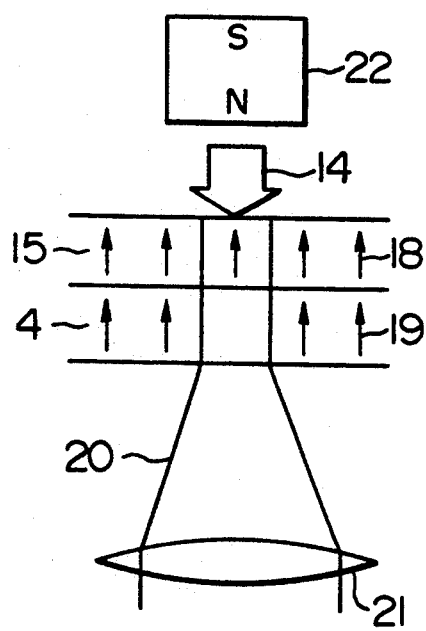
FIGS. 5A and 5B are diagrams for explaining the principle of overwrite and low laser power level $P_L$.
Figure 5B:
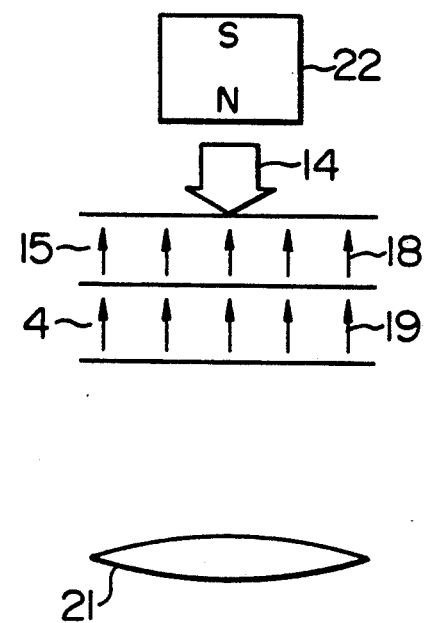
Figure 6:
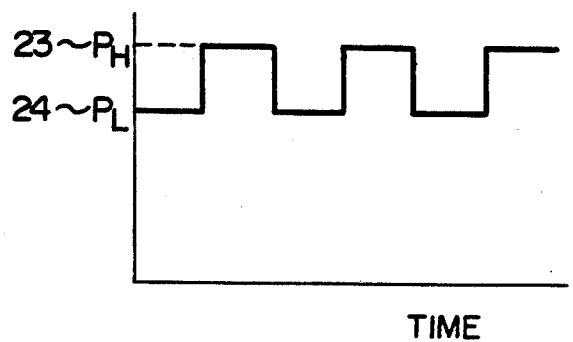
FIG. 6 is a diagram for explaining the principle of overwrite and laser level modulation ($P_L$, $P_H$).
Figure 7:
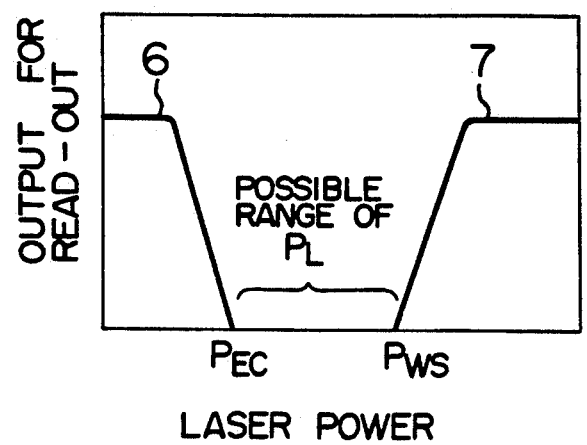
FIG. 7 is a diagram for explaining the erasing of the magneto-optical recording medium, recording characteristics and possible range of $P_L$ which make it possible to overwrite.
Figure 8:
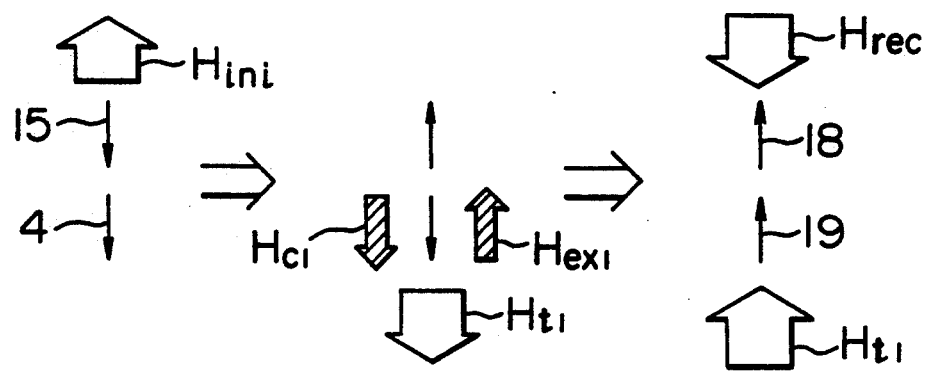
Figure 9:
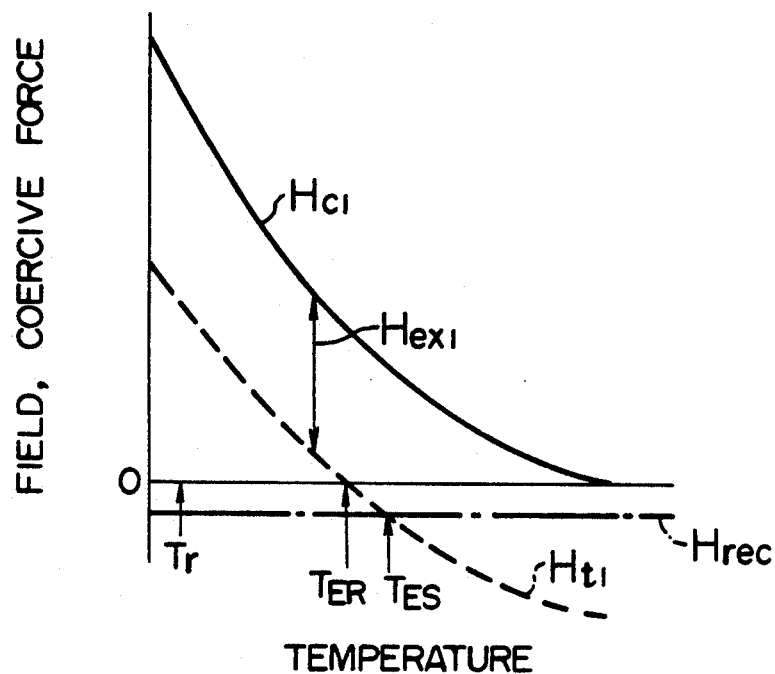
Figure 10:
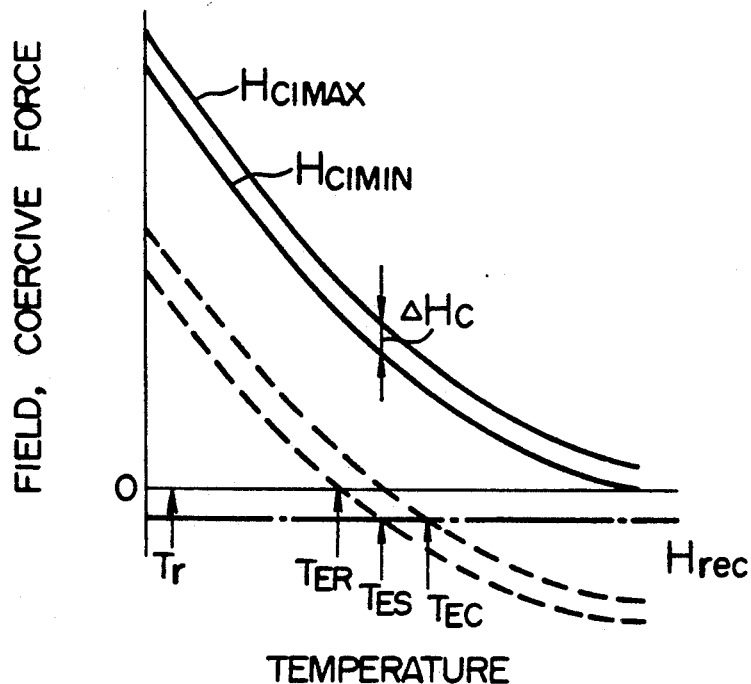

These two completed magneto-optical recording media A, B were rotated at 2400 rpm, and nonmodulated (DC-like) laser light of a constant intensity of 6 mW was irradiated at the innermost position (radius of 30 mm) of the recording area of each of the media, thus forming, or recording a stripe magnetic domain of 0.8- μm. At this time, an optical head was used which is formed of a semiconductor laser of 830-nm wavelength and a lens of 0.55, aperture number. As schematically shown in FIG. 3, when the magneto-optical recording medium is rotated and passed under the initializing magnet 17, the writing layer 15 of the magneto-optical recording medium is magnetized in the same direction as the initializing field 13.

The constant-intensity laser light was continuously irradiated on the track of the recorded stripe magnetic domain, and then the read-out intensity by read power of 1 mW was measured. FIG. 12 shows the result. In this graph, the abscissa indicates the laser power (constant-intensity laser light) irradiated on the media and the ordinate is the read-out intensity.

That is, on the magneto-optical recording medium A, the irradiated track can be completely erased by power of 3 mW ($=P_{EC}$) and recorded by power of 5 mW ($=P_{WS}$) or above as indicated by the solid line. On the magneto-optical recording medium B, the track can be completely erased by power of 4 mW ($P_{EC}$), and recorded by power of 7.5 mW ($=P_{WS}$) or above as indicated by the broken line.

Therefore, the magneto-optical recording medium A has a margin of about 2 mW ($=P_{WS}-P_{EC}$) for the setting range of erase power, and the magneto-optical recording medium B has a margin of about 3.5 mW for the setting range of erase power $P_L$.

These magneto-optical recording media were used to record a 3-MHz signal by writing power $P_M$ of 11 mW, erase power $P_L$ of 4 mW for medium A, 6 mW for medium B, and then to overwrite a 5-MHz signal.

Table 1 lists the results. From the table, it will be seen that as to both the media A, B, the 3-MHz signal can be completely erased in the absence of tracking offset. However, when a tracking offset of 0.1 μm was tentatively caused for the examination of erase residue, the medium B had no erase residue, but the medium A had about 20 dB of erase residue, as listed on Table 1. From the above, it will be understood that this magneto-optical recording medium B has high-reliability characteristics since it satisfies the condition of the invention that the difference between $P_{WS}$ and $P_{EC}$ is at least 2.5 mW or above.

In this embodiment, the 2.5 mW or above difference between $P_{WS}$ and $P_{EC}$ can be obtained by properly adjusting the thickness of the silicon nitride properties film 5.

TABLE 1

| Media | Without offset | With offset of 0.1 μm |
|-------|---------------|----------------------|
| A | 0 dB | 20 dB |
| B | 0 dB | 0 dB |

Embodiment 2

Figure 13:
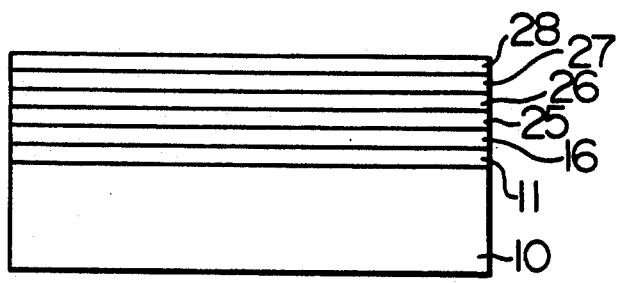
FIG. 13 is a cross-sectional diagram of another embodiment of an magneto-optical recording medium of the invention.

FIG. 13 is a longitudinal cross-sectional diagram of a magneto-optical recording medium. The following films were sequentially deposited by sputtering on a polycarbonate substrate 10 of 3.4-inch diameter having a track pitch of 1.4 μm.

First, the polycarbonate substrate was sputter-etched in vacuum and then a silicon dioxide film 11 was deposited thereon to a thickness of about 50 Å. After the sputtering apparatus was evacuated to $8 \times 10^{-7}$ Torr or below, a gas mixture of Ar gas and $N_2$ gas was introduced thereinto, and sintered silicon nitride for the target was sputtered at a gas pressure of 10 mTorr to form a silicon nitride film 16 of 800 Å.

After similar evacuation, an alloy target of TbFeCoNb was sputtered at a gas pressure of 5 mTorr to form a TbFeCoNb film as a memory layer 25. Then, after similar evacuation, a GdTbFeCo alloy target was sputtered at a gas pressure of 5 mTorr to form a GdTbFeCo film of 700 Å as a writing layer 26. After the same processes, a silicon nitride film as a protective layer 27 was deposited to a thickness of 200 Å.

Finally, an Al-Ti alloy film 28 as a thermal diffusive layer was deposited. At this time, the thickness of the Al-Ti alloy film was changed to be 400 Å for a magneto-optical recording medium C, 1100 Å for a magneto-optical recording medium D.

These completed media C and D were rotated at 3600 rpm at an ambient temperature of 25° C. Non-modulated (DC-like) laser light of a constant intensity of 7 mW was irradiated at the innermost position (25 mm radius) of the recording range on the media to form or record a stripe magnetic domain of 0.75 μm width. At this time, an optical head was used which is formed of a 780-nm wavelength semiconductor laser and a lens of aperture number, 0.55. As schematically shown in FIG. 3, when each of the media was rotated to pass under the initializing magnet 17, the writing layer 15 (26) of the media was magnetized in the same direction as the initializing field 13.

Figure 14:
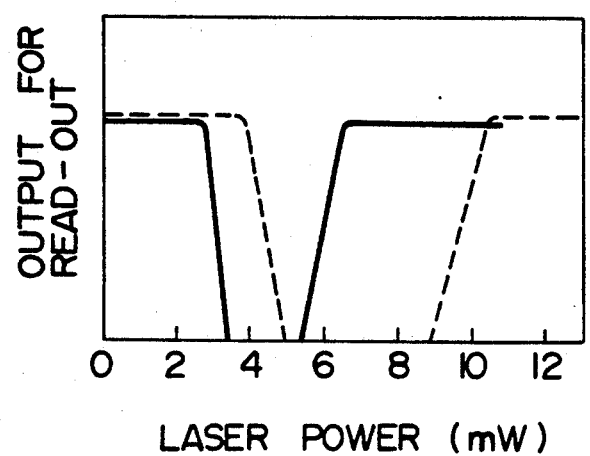
FIG. 14 is a diagram showing the erase, writing characteristics of the magneto-optical recording medium of embodiment 2.

Then, laser light of a constant intensity was continuously irradiated at the stripe domain recorded track, and thereafter a read-out output by read-out power of 1.5 mW was measured. The result is shown in FIG. 14, in which the abscissa is the irradiated laser power (constant-intensity laser light) and the ordinate is the read-out output. From this diagram, it will be seen that as to the medium C, the track is completely erased by power of 3.5 mW (=$P_{EC}$) but recorded at 5.5 mW ($P_{WS}$) or above as indicated by the solid line, and that as to the medium D, the track is completely erased at power of 5 mW (=$P_{EC}$) but recorded at power of 9 mW (=$P_{SW}$) as indicated by the broken line. Accordingly, the medium C has a margin of 2 mW (=$P_{WS}-P_{EC}$), and the medium D has a margin of 4 mW.

This medium C was used to record a 5 MHz signal at an ambient temperature of 50° C. under a set condition of 8 mW writing power $P_H$ and 5 mW erase power $P_L$, and then to overwrite a 7 MHz signal.

The same experiment as above was performed for the medium D. At this time, $P_H$ and $P_L$ were 12 mW and 7 mW, respectively. The result is listed on the following table 2. From this table, it will be seen that when both media C, D have no tracking offset and when they are tentatively placed under a condition of 0.1-μm tracking offset and temperature of 50° C., the 5 MHz signal can be completely erased.

However, when both media were tentatively placed under a condition of 0.1-μm tracking offset and temperature of 0° C. upon recording of 5 MHz signal, the erase residue was about 20 dB on the medium C and 0 dB on the medium D as listed on Table 2. Since the medium D satisfies the condition of the invention that the difference between $P_{WS}$ and $P_{EC}$ is at least 2.5 mW or above, it has highly reliable characteristics.

In this embodiment, 2.5 mW or above between $P_{WS}$ and $P_{EC}$ is obtained by properly adjusting the thickness of the Al-Ti film as a thermal diffusive layer.

TABLE 2

| Media | Without offset | With 0.1 μm offset 50° C. | 0° C. |
|---|---|---|---|
| C | 0 dB | 0 dB | 10 dB |
| D | 0 dB | 0 dB | 0 dB |

Embodiment 3

100 media C and 100 media D according to embodiment 2 were produced, $P_L$ and $P_H$ were respectively selected to be the same values as above, a 5 MHz signal was recorded at room temperature, and then a 7 MHz signal was overwritten. Of these samples, 8 media C had an erase residue, but all media D had no erase residue.

Embodiment 4

(1) Production of Disk

A disc-like glass substrate having tracking grooves was placed within a sputter apparatus having three targets so as to be set at a distance of 10 cm from the targets, and rotated.

An argon-nitrogen gas mixture of 10%-nitrogen concentration was introduced in the sputter apparatus, and silicon Si was reactive-sputtered from the first target at a gas pressure of 5 mTorr to form a first dielectric layer of $Si_3N_4$ of 850-Å thickness on the substrate. Then, an alloy of Tb-Fe-Co was sputtered in argon gas at a gas pressure of 5 mTorr from the second target to form a memory layer of $Tb_{26.5}Fe_{64.5}Co_9$ having a thickness of 200 Å, Curie temperature of about 200° C. and a coercive force $Hc_1$ of 10 kOe.

In addition, an alloy of Tb-Dy-Fe-Co was sputtered at an argon gas pressure of 5 mTorr from the third target to form a writing layer of $Tb_{14}Dy_{17}Fe_{43}Co_{26}$ having a thickness of 900 Å, Curie temperature of about 300° C., a coercive force $Hc_2$ of 2 kOe, and a compensation temperature of about 150° C. Moreover, silicon Si was reactive-sputtered in an argon-nitrogen gas mixture of 10% nitrogen at a gas pressure of 5 mTorr from the first target to form a second dielectric layer of $Si_3N_4$ having a thickness of 200 Å. Finally, aluminum Al was sputtered at an argon gas pressure of 5 mTorr from the fourth target to form a metal layer of about 300 Å, completing a disk A.

Other disks, or disk B, disk C and disk D, were similarly produced, but the constituents of the memory layer of the disk A were changed as listed on Table 3.

(2) Dependence of Erase Start Temperature on Magnetic Field

These four different disks having different magnetic characteristics were examined on the erase characteristics. First, DC light (laser light of a constant intensity) was irradiated on the disks at a linear speed of 11 m/s to record a stripe-shaped magnetic domain of 0.8 μm width on each disk. Then, DC light with Hrec and laser power changed was irradiated on each disk, and the power $P_{ES}$ at which the read-out output starts to decrease was read.

Figure 15:
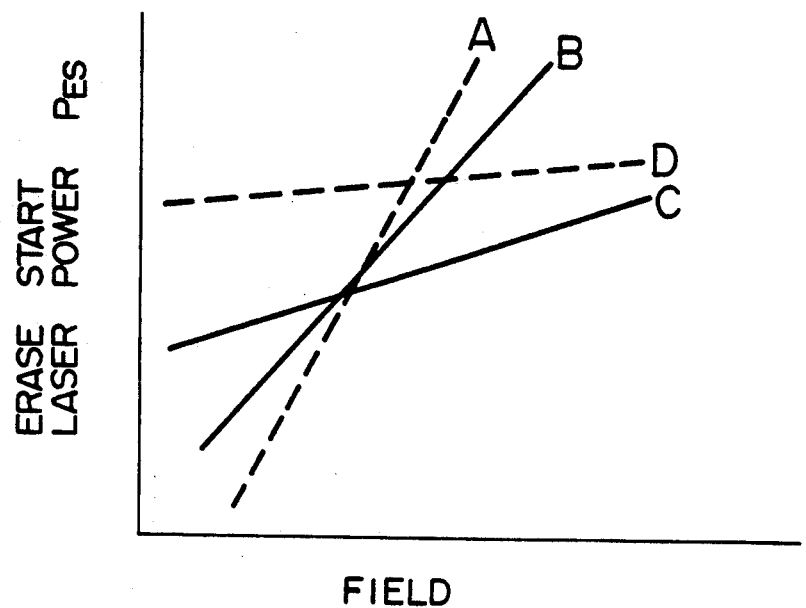

The results are shown in FIG. 15. From the results, it was found that the rate of change, K' of $P_{ES}$ of the conventional disk A relative to Hrec was as large as 1.8 mW/kOe and that the rate of change, K' of $P_{ES}$ of disks B, C and D was as small as 1.2 mW/kOe. This is because the change of the switching field $Ht_1$ of the memory layers of the disks B, C and D with respect to temperature is greater than that of the disk A. In other words, when the change of the switching field $Ht_1$ with respect to temperature is great, the dependence of the erase start temperature $T_{ES}$ on the writing field Hrec is small. Thus, the dependence of the erase characteristics on the magnetic field fully reflects the magnetic characteristics of each disk.

(3) Power dependence of erase characteristics

The values of $P_{EC} - P_{ES}$ indicating the sharpness of erase of the disks were compared. The experiment for this was made according to the following procedure.

First, the land and groove portions were initialized by sufficiently large laser power, and then DC laser light was irradiated on the land portion to form a strip-shaped magnetic domain of 0.8-μm width.

Moreover, DC laser light was irradiated under a linear speed of 11 m/s and writing field of 40 kA/m (500 Oe) and the read-out output level was read by read-out power $P_R$ of 0.5 mW.

Figure 16:
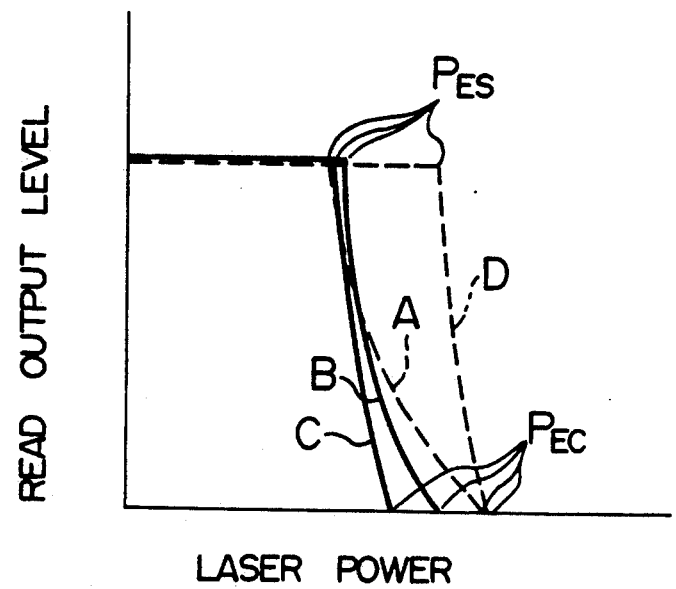

The results are shown in FIG. 16. From this graph, it will be seen that the read-out output level of each disk decreases with the increase of irradiated laser power. This implies that the written stripe-shaped magnetic domain starts to be gradually erased ($P_{ES}$), and finally completely erased Comparison will be made of the rates of reduction of read-out output level of each disk. In disk A, laser power of 2.4 mW was required until the read-out output starts to decrease and finally becomes zero, or until the recorded domain starts to be erased and finally completely erased. As a result, the erase power margin ($P_{WS} - P_{ES}$: the difference between laser power at the end of erase and laser power at the start of writing) is 3.4 mW. Normally, the power margin of erase power level is preferably 4 mW or above. Therefore, it was found that the disk A was not able to attain the target erase power margin.

In disks B and C, since the difference $P_{EC} - P_{ES}$ was much small, $P_{WS} - P_{ES}$ was above the target value of 4.0 mW, and thus an extremely large effect could be achieved.

In disk D, however, although $P_{EC} - P_{ES}$ was small, the compensation temperature $Tcomp_1$ of the memory layer was too high, leading to a large coercive force and a high value, 160° C., of $T_{ES}$. As a result, the $P_{ES}$ of the disk D became large, and thus the difference $P_{EC} - P_{ES}$ was below the target value of 4.0 mW.

(4) Reliability for Read Light

When the intensity of read light is gradually increased, erasing starts. The read power at this time, $P_{RH}$ is the index indicative of the reliability for read light. Also, the recorded magnetic domain becomes easy to erase when the disk temperature increases. Therefore, for examining the reliability for read light, it is desired to increase the ambient temperature over ordinary room temperature. Thus, the values of $P_{RH}$ of disks A, B, C and D were examined under the conditions that the temperature within the drive for the disks was 50° C. and that the temperature of the disks was increased. First, as in the previous experiment, the stripe-shaped magnetic domain of 0.8 μm width was recorded on each disk. Then, the read-out output level change was measured at a linear speed of 11 m/s and with read laser power $P_R$ being gradually increased.

The results are shown in FIG. 17. From this graph, it will be seen that the read-out output level increases with the increase of $P_R$. This implies that the amount of reflected light from the disk increases with the increase of $P_R$. Also, the read-out output level of each disk starts to decrease at a certain laser power. This implies that the erase process is caused by the read light $P_R$.

The values of $P_{RH}$ of the disks were compared. First, the recorded magnetic domain of disk A was erased by power of 0.5 mW. It is normally desired that the read light to the magneto-optical disk be 1 mW or above. Therefore, the disk A is erased by the read light at an ambient temperature of 50° C.

The value of $P_{RH}$ of the disk B which has the smallest value of $P_{RH}$ among the disks B, C and D is as large as 1.2 mW, or over 1 mW. Thus, the reliability of data can be maintained to be high even when the ambient temperature is as high as 50° C.

On Table 3, , X indicate the evaluation results of the disks. In other words, as to the "erase power margin", the disk having an erase power margin of 4 mW or above which can be supposed to cope with various disturbances is indicated by , and the disk having an erase power margin of less than 4 mW under which condition it has a possibility of an erase residue is indicated by X.

As to the "tolerance to read light", the disk of which the recorded magnetic domain is not erased by read light even when the ambient temperature is increased to 50° C. is indicated by , and the disk of which the recorded magnetic domain is erased by read light is indicated by X.

Thus, from the table 3, it will be obvious that the disks B and C have large erase power margins and good tolerance to read light and are thus greatly useful.

Figure 19:
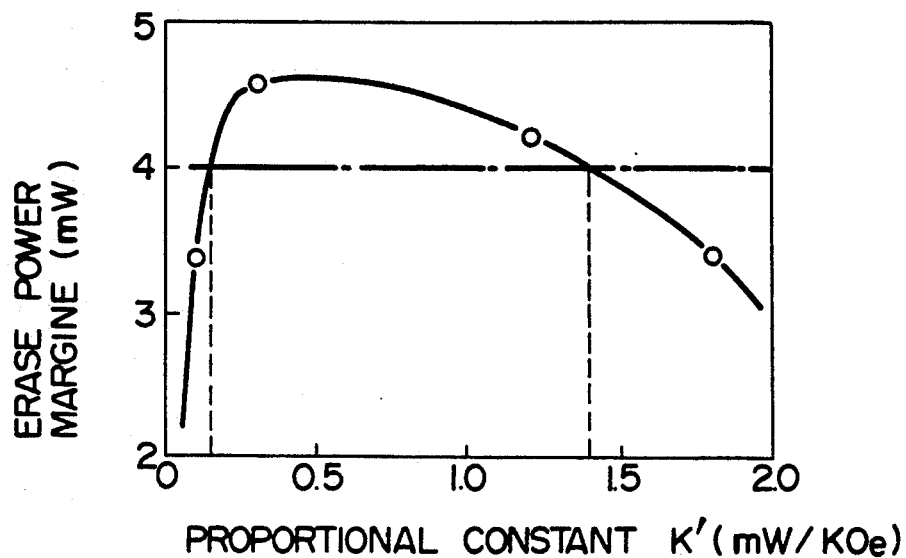

FIG. 18 shows the relation between the erase power margin $P_{WS} - P_{EC}$ and the proportional constant K, and FIG. 19 shows the relation between the erase power margin $P_{WS} - P_{EC}$ and the proportional constant K'. From FIGS. 18 and 19, it will be understood that the ranges of proportional constants K and K' within which a sufficiently large erase power margin over 4 mW can be assured can be given below:

$$50 \ (Oe/°C.) < K < 220 \ (Oe/°C.)$$

$$0.2 \ (mW/kOe) < K' < 1.4 \ (mW/kOe); (1 \ Oe = 79.6 \ A/M).$$

Figure 20:
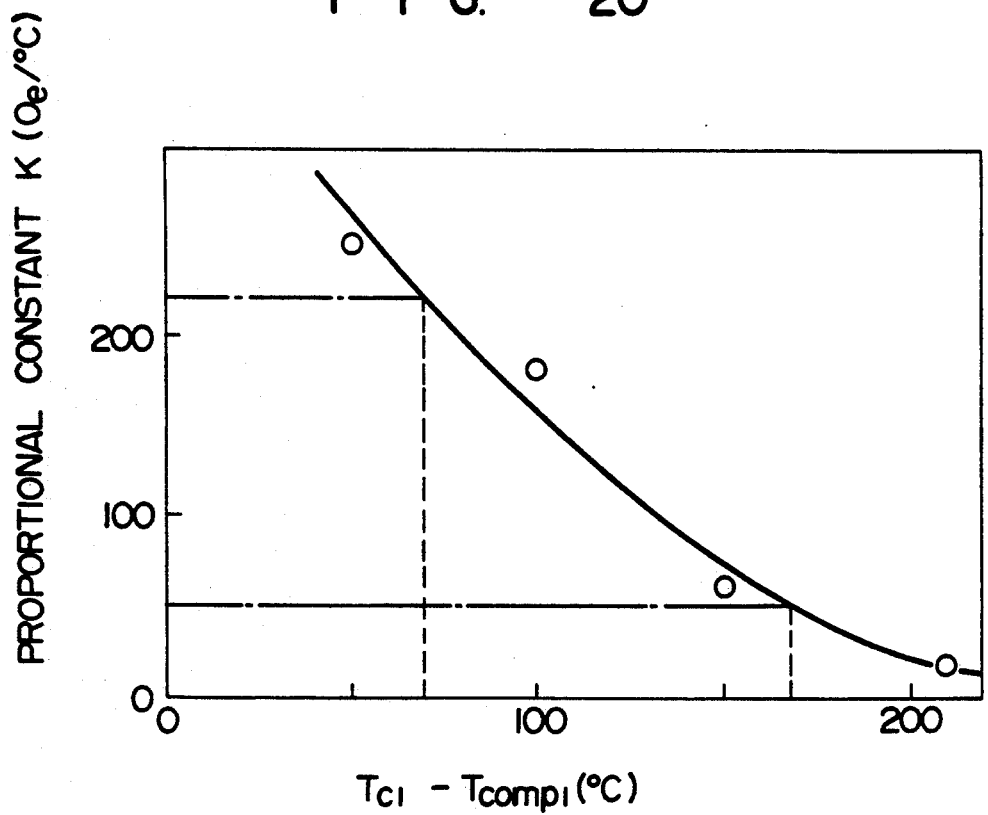

FIG. 20 shows the relation of the proportional constant K to the difference $Tc_1 - Tcomp_1$ between the compensation temperature $Tcomp_1$ and Curie temperature $Tc_1$ of the memory layer. From FIG. 20, it will be seen that in order for the proportional constant K to be within the above range the difference $Tc_1 - Tcomp_1$ is necessary to be $$70° \ C. < Tc_1 - Tcomp_1 < 160° \ C.$$

As in the embodiment, when the switching field $Ht_1$ of the memory layer with respect to temperature T is $$Ht_1 = -K \cdot T + A \ (A \ is \ a \ constant),$$

at the erase start temperature $T_{ES}$ the proportional constant K is selected to satisfy the condition of $$50 \ (Oe/°C.) < K < 220 \ (Oe/°C.)$$

as in the disks B and C. At this time a satisfactory erase power margin can be assured, and information can be read out without reducing the reliability even when the ambient temperature increases.

However, when $$K \leq 50 \ (Oe/°C.)$$

as in the disk A, the laser power required unit1 the recorded magnetic domain is completely erased from the start of erasing is large, and thus a sufficiently large erase power margin cannot be obtained. In addition, when the ambient temperature is raised to 50° C., the recorded magnetic domain starts to be erased by the practical read power level, and hence information cannot be read out.

When $$220 \ (Oe/°C.) \leq K$$

as in the disk D, the laser power required until the recorded magnetic domain is completely erased from the start of erasing is small, but the difference between the compensation temperature Tcomp₁ and Curie temperature Tc₁ of the first magnetic layer must be selected to be $$Tc_1 - Tcomp_1 \leq 70° \ C.$$

Thus, the erase start temperature is greatly increased as compared with the other disks. As a result, the erase start laser power P_ES increases, and thus a sufficiently large erase power margin cannot be assured.

Moreover, since the medium temperature and the irradiated laser power have a close relation as described in the above embodiments, the relation between the switching field Ht₁ and the temperature T can be replaced by the relation between the writing field Hrec and the erase start laser power P_ES. Therefore, when the writing field Hrec dependence of the laser power P_ES at which the recorded information starts to be erased when the irradiated laser power is gradually increased is expressed as $$P_{ES} = K' \cdot Hrec + B \ (B \text{ is a constant}),$$

the proportional constant K' is selected to be $$0.2 \ (mW/kOe) < K' < 1.4 \ (mW/kOe)$$

so that a satisfactory erase power margin can be assured as in the disks B and C, and information can be read out without reducing the reliability even when the ambient temperature rises (1 Oe=79.6 A/M).

However, if $$1.4 \ (mW/kOe) \leq K'$$

as in the disk A, the laser power required until the recorded magnetic domain is completely erased from the start of erasing is large, and thus a sufficiently large erase power margin cannot be obtained. Also, when the ambient temperature rises to 50° C., the recorded magnetic domain starts to be erased by the practical read power level and hence information cannot be read out.

When $$K' \leq 0.2 \ (mW/kOe)$$

as in the disk D, the laser power required until the recorded magnetic domain is completely erased from the start of erasing is small, but the difference between the compensation temperature Tcomp₁ and Curie temperature Tc₁ of the memory layer must be selected to be $$Tc_1 - Tcomp_1 \leq 70° \ C.$$

Thus, the erase start temperature is greatly increased as compared with the other disks. As a result, the erase start laser power P_ES increases, and thus a satisfactorily large erase power margin cannot be assured.

In addition, in order for the proportional constants K and K' to be the above values, it is necessary to select the relation between the Curie temperature Tc₁ and compensation temperature Tcomp₁ of the first magnetic layer as $$70° \ C. < Tc_1 - Tcomp_1 < 160° \ C.$$

as in the disks B and C.

Moreover, if the difference between the erase start temperature T_ES and the compensation temperature Tcomp₁ of the memory layer is within the range of $$20° \ C. < T_{ES} - Tcomp_1 < 70° \ C.,$$

the effect is great.

When $$160° \ C. \leq Tc_1 - Tcomp_1$$

as in disk A or when $$Tc_1 - Tcomp_1 \leq 60° \ C.$$

as in disk D, the proportional constants K and K' cannot be selected to be appropriate values as above, and thus satisfactory characteristics cannot be obtained.

TABLE 3

| | Characteristics of disks Disks | | | |
|---|---|---|---|---|
| | A | B | C | D |
| Concentration | | | | |
| Tb (at %) | 26.5 | 27.0 | 28.0 | 29.0 |
| Fe (at %) | 64.5 | 64.5 | 63.5 | 63.0 |
| Co (at %) | 9.0 | 8.5 | 8.5 | 8.0 |
| Curie temperature (°C.) | 200 | 200 | 200 | 200 |
| Compensation temp. (°C.) | Below room temp. 50 | | 100 | 150 |
| T_E (°C.) | 120 | 120 | 120 | 160 |
| K (Oe/°C.) | 20 | 60 | 180 | 250 |
| K' (mW/kOe) | 1.8 | 1.2 | 0.3 | 0.1 |
| P_RH (mW) | 0.5 | 1.2 | 1.8 | 3.5 |
| P_ES (mW) | 3.1 | 3.3 | 3.2 | 4.8 |
| P_EC (mW) | 5.5 | 4.8 | 4.2 | 5.6 |
| P_WC (mW) | 8.9 | 9.0 | 8.8 | 9.0 |
| Erase power margin | X | O | O | X |
| Tolerance to read power | X | O | O | O |

What is claimed is:

1. A magneto-optical recording medium of the type in which at least an exchanged-coupled magnetic double layer of a memory layer and a writing layer, and a protective layer are formed on a substrate,
    said magneto-optical recording medium being overwritable by a laser light irradiated on said magnetic double layer from said memory layer side and being modulated to have two power levels, high power (writing power) and low power (erase power), and
    said magneto-optical recording medium being readable by a laser light of a lower level than said low power level,
    wherein a striped shaped magnetic domain is writable at the innermost position of an actually used region of said medium by a nonmodulated laser light of a constant intensity, and the stripe shaped magnetic domain is completely erasable by a laser light of gradually increased intensity at a power P_EC and rewritable at power $P_{WS}$, the difference between $P_{EC}$ and $P_{WS}$ being 2.5 mW or above.

2. A magneto-optical recording medium according to claim 1, wherein the difference between power $P_{EC}$ and power $P_{WS}$ is selected to be 2.5 mW or above by controlling the constituents and thickness of said double-layer and a protective layer.

3. A magneto-optical recording medium according to claim 1, wherein a thermal diffusive layer is formed on said protective layer and the thickness of said thermal diffusive layer is controlled so that the difference between power $P_{EC}$ and power $P_{WS}$ is 2.5 mW or above.

4. A magneto optical recording medium according to claim 1, wherein the striped-shaped magnetic domain has a width of 0.5–0.9 μm.

5. A magneto-optical recording medium according to claim 1, wherein said magneto-optical recording medium is a 3.5-inch–5.25-inch disk.

6. An overwrite recording method for irradiating intensity-modulated laser light on a magneto-optical recording medium having at least an exchanged-coupled magnetic double-layer of a memory layer and writing layer, wherein nonmodulated laser light of a constant intensity is irradiated on said magneto-optical recording medium at the innermost position of an actually used region of said medium so as to write a stripe-shaped magnetic domain, and when said laser light of a constant intensity is again irradiated on said recorded magnetic domain while its intensity is gradually increased, said magnetic domain is completely erased at power $P_{EC}$ and said magnetic domain starts to be again written at power $P_{WS}$ in which case the difference between $P_{EC}$ and $P_{WS}$ is controlled to be 2.5 mW or above by setting at least one of the revolution rate of said medium, the wavelength of writing laser light and the aperture number of an object lens for focusing said laser light on said medium, to a pre-determined value.

7. An overwrite recording method for a magneto-optical recording medium according to claim 6, wherein said revolution rate of said medium is 2400 revolutions/min or above, the wavelength of said laser light is 833 nm or below and the aperture number of said object lens is 0.55 or above.

8. A magneto-optical recording medium of the type in which at least an exchanged-coupled magnetic double layer of a memory layer and a writing layer are formed on a substrate, said magneto-optical recording medium being overwritable by a laser light irradiated on said magnetic double layer from said memory layer side and being modulated to have two power levels, high power (writing power) and low power (erase power), and said magneto-optical recording medium being readable by a laser light of a lower level than said low power level, wherein said magneto-optical recording medium has a switching field $Ht_1$ of said memory layer relative to temperature T expressed as $$Ht_1 = -K \cdot T + A \text{ (}A \text{ is a constant)},$$

wherein the proportional constant K is selected to be $$50 \ (Oe/^\circ C.) < K < 220 \ (Oe/^\circ C.)$$

at an erase start temperature $T_{ES}$ at which previously recorded information starts to be erase when the temperature of said medium is increased (1 Oe=79.6 A/M).

9. A magneto-optical recording medium according to claim 8, wherein the power $P_{ES}$ of irradiated laser light at which recorded information starts to be erased has a dependence on a writing magnetic field Hrec as expressed by $$P_{ES} = K' \cdot Hrec + B \text{ (}B \text{ is a constant)},$$

the proportional constant K' satisfies the following condition:

$$0.2 \ (mW/kOe) < K' < 1.4 \ (mW/kOe) \ (1 \ Oe = 79.6 \ A/M).$$

10. A magneto-optical recording medium according to claim 8, wherein the relation between Curie temperature $Tc_1$ and compensation temperature $Tcomp_1$ of said memory layer is expressed by $$70^\circ C. < Tc_1 - Tcomp_1 < 160^\circ C.$$

11. A magneto-optical recording medium according to claim 8, wherein said erase start temperature $T_{ES}$ and compensation temperature $Tcomp_1$ of said memory layer satisfy the following relation:

$$20^\circ C. < T_{ES} - Tcomp_1 < 70^\circ C.$$

12. An overwrite recording method for a magneto-optical recording medium of the type in which at least an exchange-coupled magnetic double-layer of a memory layer and writing layer are formed on a substrate, laser light is irradiated on said magnetic double-layer from said memory layer side, the power of said laser light is modulated to have two levels, high power (writing power) and low power (erase power), making overwrite possible, and laser light of a lower level (read-out power) than said low power level is irradiated to read information, wherein when a switching field $Ht_1$ of said memory layer relative to temperature T is expressed as $$Ht_1 = -K \cdot T + A \text{ (}A \text{ is a cosntant)},$$

the proportional constant K is selected to be $$50 \ (Oe/^\circ C.) < K < 220 \ (Oe/^\circ C.)$$

at an erase temperature $T_{ES}$ at which the already recorded information starts to be erased when the temperature of said medium is increased, by setting at least one of the revolution rate of said medium, the wavelength of writing laser light and the aperture number of an object lens for focusing said laser light on said medium, to a predetermined value (1 Oe=79.6 A/M).

* * * * *